J. A. PEABODY & A. F. CHAMPLIN.

Improvement in Leech-Nuts.

No. 126,482.  Patented May 7, 1872.

WITNESSES.
George L. Upham
E. H. Bates

INVENTORS.
J. A. Peabody,
A. F. Champlin,
Chipman Hosmer & Co,
Attys.

126,482

UNITED STATES PATENT OFFICE.

JAMES A. PEABODY AND AMOS F. CHAMPLIN, OF WESTERLY, R. I., ASSIGNOR OF ONE-FOURTH THEIR RIGHTS TO T. H. BROWNING, OF SAME PLACE.

IMPROVEMENT IN LOCK-NUTS.

Specification forming part of Letters Patent No. 126,482, dated May 7, 1872.

*To all whom it may concern:*

Be it known that we, JAMES A. PEABODY and AMOS F. CHAMPLIN, of Westerly, in the county of Washington and State of Rhode Island, have invented a new and valuable Improvement in Nut-Locks; and we do hereby declare that the following is a full, clear, and exact description of the construction and operation of the same, reference being had to the annexed drawing making a part of this specification, and to the letters and figures of reference marked thereon.

Figure 1:
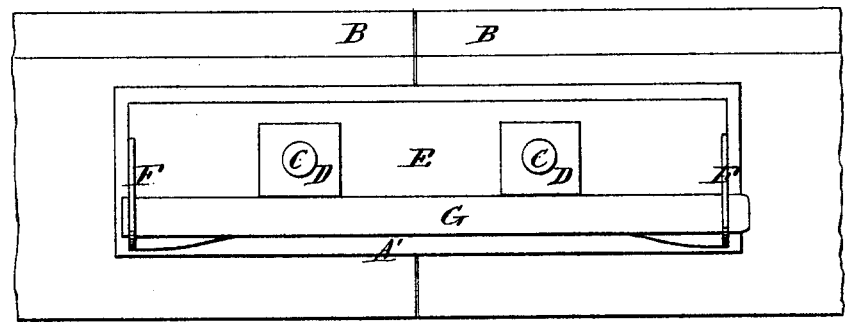
Figure 2:
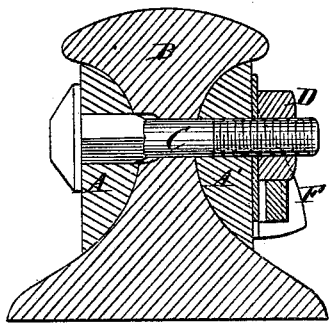
Figure 3:
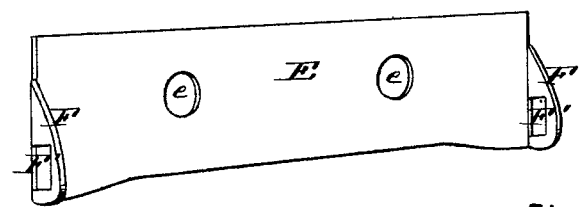
Figure 4:

Figure 1 of the drawing is a representation of a side view of our invention. Fig. 2 is a transverse vertical section of the same. Figs. 3 and 4 are detail views of the same.

This invention has relation to nut-locks for the joints of railroad rails; and consists in the construction and novel arrangement of a plate having slotted ears, and a bent bar having a notched end, which are applied to the rails in such a manner as to effectually prevent the turning of the nuts on the ends of the bolts passing through the fish-plates, as hereinafter described.

Referring to the drawing, A A' designate the fish-plates, applied to the joint of two connected rails, B. C C are the fastening-bolts, and D the nuts placed thereon. E designates a metal plate, having holes $e$ to receive the ends of the bolts. This plate is placed against the fish-plate A' and over the bolts before the nuts are turned on. At either end of said plate an ear, F, is bent, and a slot, F', cut therein. After the nuts are fitted so that their lower sides are on a line, a bar, G, is passed into the slots F', as shown in drawing. At one end of said bar a notch, $g$, is cut to fit the outer edge of the slot in which said end rests. The bar is slightly bent, so that, when in place, its middle part touches the fish-plate, and thus throws the notched end out far enough to catch.

The bar G prevents the nuts from turning, and may be removed by pressing the notched end toward the rails.

The plate E may be arranged so that the bar G may lie either under or above the nuts. In the latter case room is allowed for driving spikes into the sleepers.

What we claim as our invention, and desire to secure by Letters Patent, is—

The plate E having the hole $e$ and slotted ears F, and the bent bar G having the notch $g$, in combination with the bolts D, nuts C, and rails B, substantially as specified.

In testimony that we claim the above we have hereunto subscribed our names in the presence of two witnesses.

JAMES A. PEABODY.
AMOS F. CHAMPLIN.

Witnesses:
THOS. H. PEABODY,
JOHN P. RANDALL.